(No Model.) 2 Sheets—Sheet 1.
B. F. HARWOOD.
COTTON STALK PULLER.
No. 595,626. Patented Dec. 14, 1897.
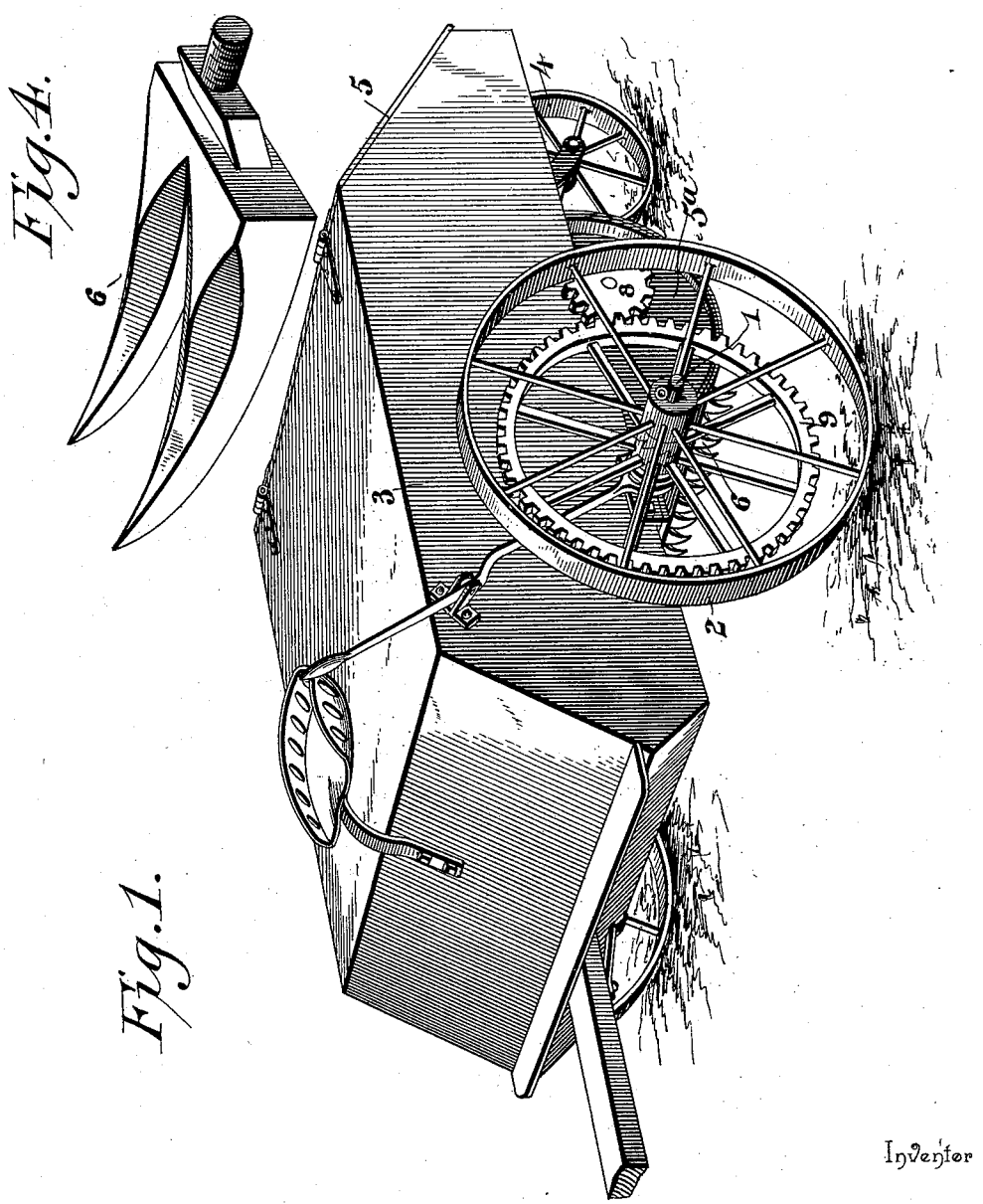
Witnesses
Inventor
Benjamin F. Harwood
By his Attorneys,
C. A. Snow & Co.

(No Model.) 2 Sheets—Sheet 2.
B. F. HARWOOD.
COTTON STALK PULLER.
No. 595,626. Patented Dec. 14, 1897.
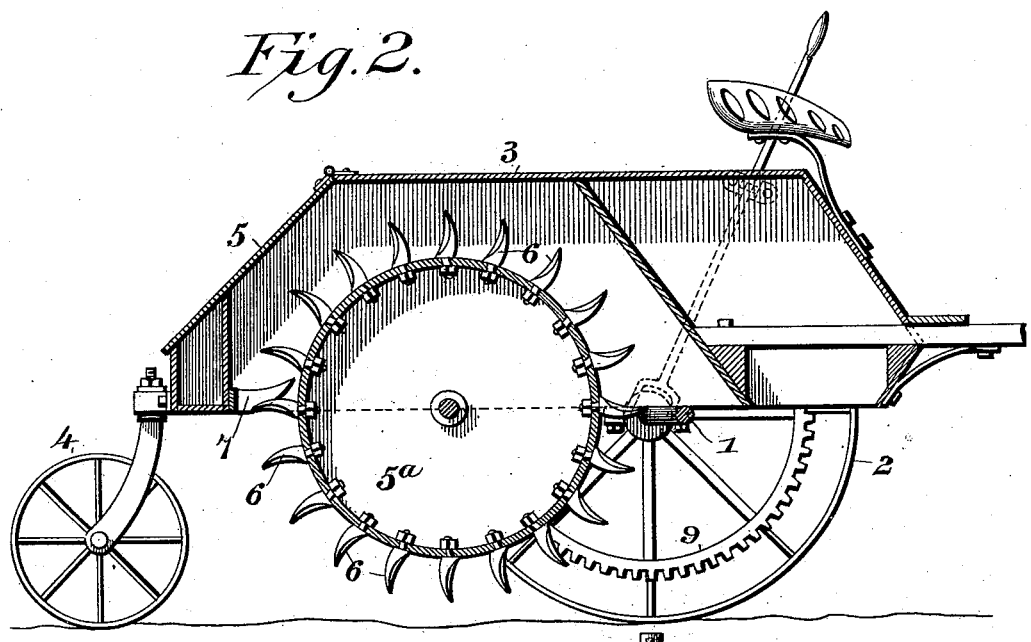
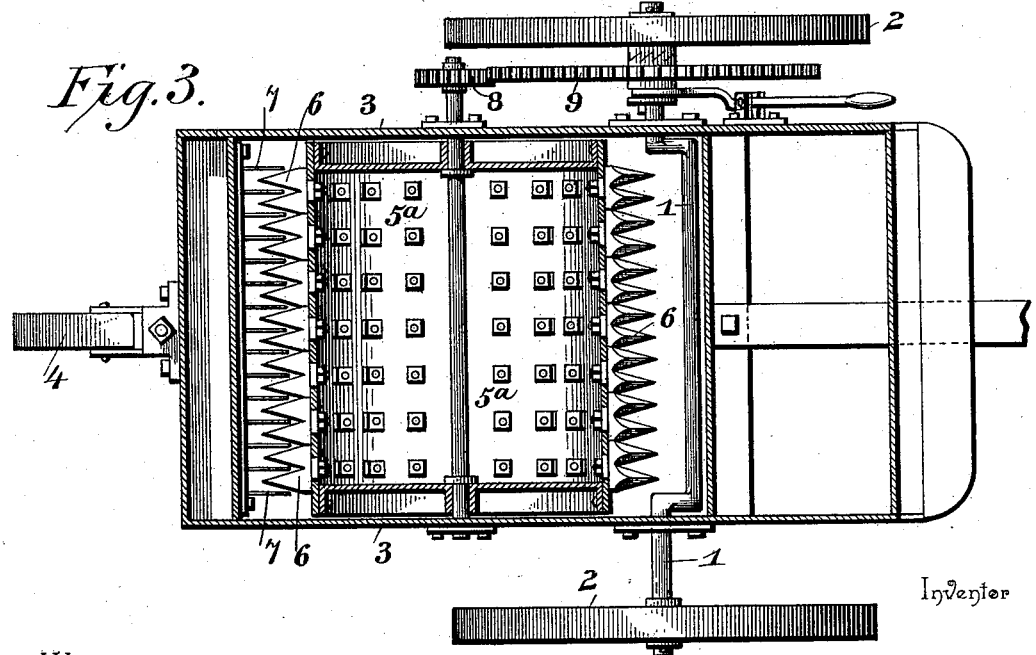

UNITED STATES PATENT OFFICE.

BENJAMIN F. HARWOOD, OF COOPER, TEXAS.

COTTON-STALK PULLER.

SPECIFICATION forming part of Letters Patent No. 595,626, dated December 14, 1897.

Application filed December 23, 1896. Serial No. 616,748. (No model.)

*To all whom it may concern:*

Be it known that I, BENJAMIN F. HARWOOD, a citizen of the United States, residing at Cooper, in the county of Delta and State of Texas, have invented a new and useful Cotton-Stalk Puller, of which the following is a specification.

My invention relates to cotton-stalk-pulling machines, and has for its object to provide mechanism for pulling and cutting cotton-stalks in the operation of clearing the ground, said mechanism being provided with engaging and pulling fingers mounted upon a movable member of the mechanism and coöperating with cutters, whereby the stalks are adapted to be reduced and deposited upon the surface of the soil in such condition as to be readily turned under by means of a plow or other cultivating device.

Further objects and advantages of this invention will appear in the following description, and the novel features thereof will be particularly pointed out in the appended claim.

In the drawings, Figure 1 is a perspective view of a cotton-stalk puller constructed in accordance with my invention. Fig. 2 is a central longitudinal section of the same. Fig. 3 is a horizontal section. Fig. 4 is a detail view of a pair of cylinder-teeth.

Similar numerals of reference indicate corresponding parts in all the figures of the drawings.

1 designates an axle, upon the spindle portions of which are mounted the ground-wheels 2, and 3 represents a frame or casing secured to said axle and provided at its rear end with a caster-wheel 4, said frame or casing being provided at its rear side with a lid or cover 5, whereby access may be had to the interior.

Mounted in the frame or casing in rear of the axle is a rotary part, as a cylinder $5^a$, provided with longitudinal rows of pulling-fingers 6, and arranged in rear of said rotary part in position to intermesh successively with the series of pulling-fingers as the latter are brought rearwardly by the rotation of the cylinder is a series of cutting fingers or knives 7, each cutting finger or knife being adapted to fit in the interval between contiguous pulling-fingers. The rotary part or cylinder receives motion by means of intermeshing gears 8 and 9, carried, respectively, by the spindle of the cylinder and the contiguous ground-wheel.

The pulling-fingers are tapered continuously toward their free or outer ends and are curved forwardly or in the direction of rotation of the cylinder, the adjacent sides of contiguous fingers intersecting each other to form tapered or V-shaped angles, between which stalks are adapted to be received as the cylinder rotates. The engagement of the pulling-fingers with the stalks is thus insured, the greater resistance offered by a stalk causing a more positive engagement of the pulling-fingers therewith. As the stalks are drawn they are carried over the cylinder and brought by means of the pulling-fingers in contact with the stationary cutting fingers or knives in rear thereof, said cutting fingers or knives serving to divide the stalks and cause them to be deposited upon the surface of the soil in short lengths, which may be readily turned under the surface by means of a plow or similar cultivating-tool. The cutting fingers or knives are preferably provided with concaved upper edges and are reduced to a point at their front ends to pass between the pulling-fingers as the latter approach the rear side of the cylinder.

Various changes in the form, proportion, and the minor details of construction may be resorted to without departing from the spirit or sacrificing any of the advantages of this invention.

Having described my invention, what I claim is—

In a stalk-pulling machine, the combination with a supporting-frame, of a hollow cylinder, contiguous longitudinal series of separate stalk-pulling fingers projecting from the surface of the cylinder, said pulling-fingers being tapered toward their outer ends, being arranged in series with their inclined sides in contact and intersecting contiguous to the surface of the cylinder, and having concaved sharpened upper edges, each pulling-finger also having a threaded stem fitted in a perforation in the wall of the cylinder and engaged by a nut bearing against the inner surface of the cylinder, fixed cutting fingers or knives arranged in a series parallel with and in rear of the cylinder, and respectively in the planes of the spaces between contiguous pulling-fingers, operating devices for the cylinder, and an interiorly-accessible hood or casing covering the cylinder and the cutting fingers or knives, substantially as specified.

In testimony that I claim the foregoing as my own I have hereto affixed my signature in the presence of two witnesses.

BENJAMIN F. HARWOOD.

Witnesses:
JOHN W. TERRELL,
W. E. LESTER.